Jan. 12, 1965    H. U. BAKER    3,165,082
WELD-CONTROLLING, PIPE-ALIGNING BAND
Filed June 13, 1960    2 Sheets-Sheet 1
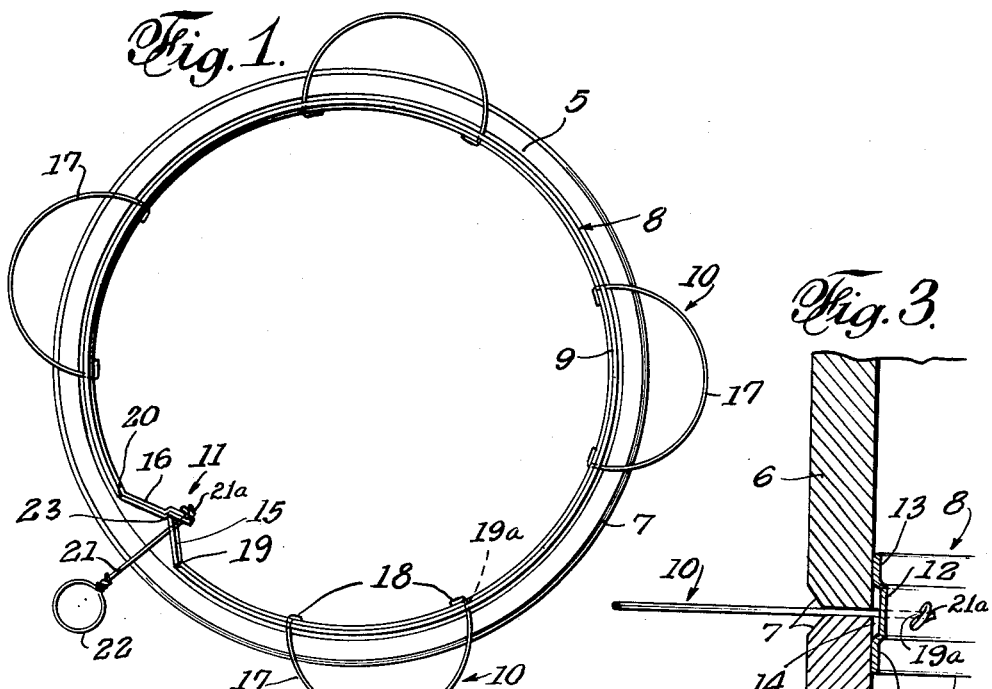
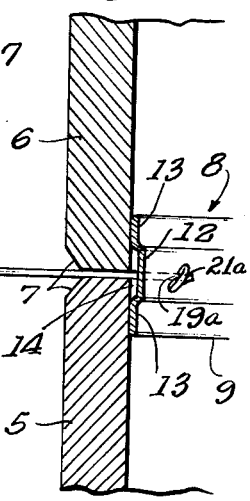
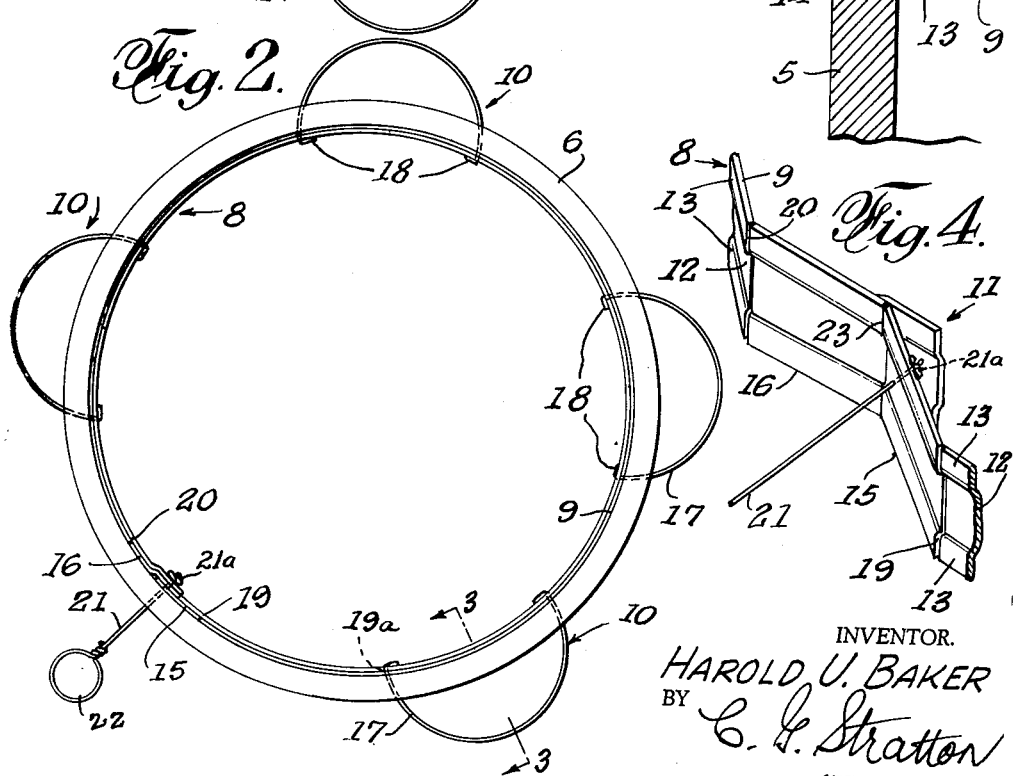
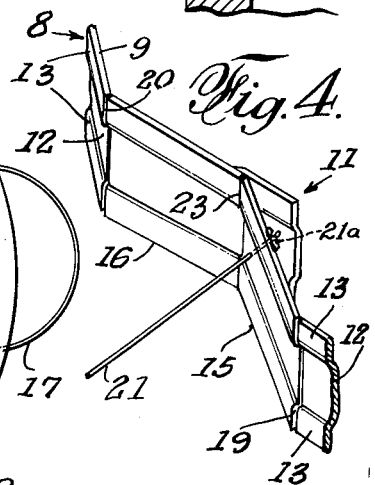
INVENTOR.
HAROLD U. BAKER
BY C. L. Stratton
ATTORNEY Jan. 12, 1965     H. U. BAKER     3,165,082
WELD-CONTROLLING, PIPE-ALIGNING BAND
Filed June 13, 1960     2 Sheets-Sheet 2
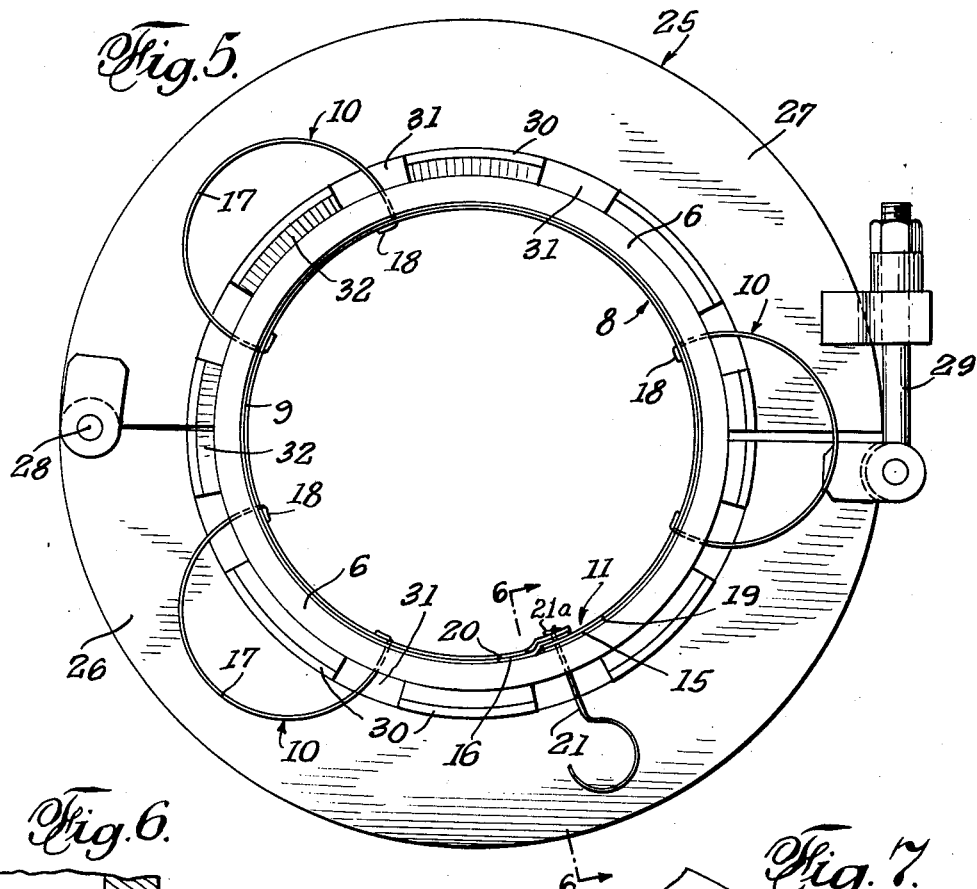
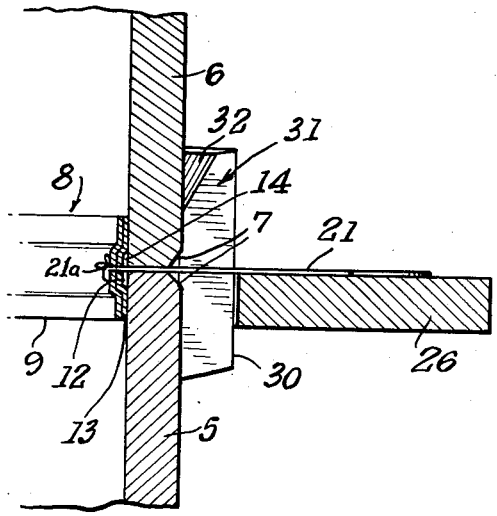
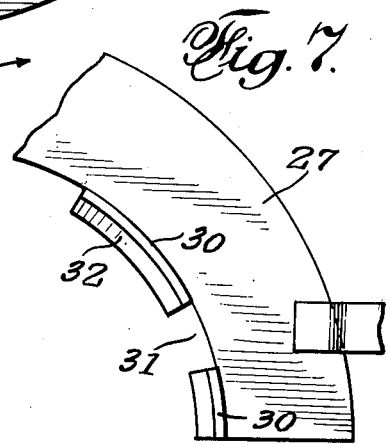
INVENTOR.
HAROLD U. BAKER
BY C. G. Stratton
ATTORNEY

United States Patent Office 3,165,082
Patented Jan. 12, 1965

3,165,082
WELD-CONTROLLING, PIPE-ALIGNING BAND
Harold U. Baker, South Pasadena, Calif., assignor to Roscoe Moss Company, Los Angeles, Calif., a corporation of California
Filed June 13, 1960, Ser. No. 35,492
6 Claims. (Cl. 113—103)

This invention relates to a weld-controlling, pipe-aligning band and to an apparatus for both placing such a band in operative position and aligning two pipes to be end-welded together. The present invention is particularly adapted for facilitating butt-welding two pipes vertically disposed one on the other, particularly with one pipe partly driven into the ground and the other pipe to form an upper extension thereof after the pipes are welded together.

An object of the present invention is to provide a band of the character above referred to so engaging the inner face of the end abutted pipes as to enable a weld to be made that extends through the wall thickness of the pipes, thereby insuring maximum strength in the welded joint.

Another object of the invention is to provide a novel apparatus in which said band is used for first guiding the alignment of two end-to-end pipes and, then, serving to control the weld, as above indicated.

A further object of the invention is to provide means for guiding out-of-round pipes to properly aligned position preparatory to welding.

This invention also has for its objects to provide a novel, economical and convenient process of superior utility, and to provide apparatus that is positive in operation, convenient in use, easily installed in working position and easily disconnected therefrom, economical of manufacture, relatively simple, and of general superiority and serviceability.

The invention also contemplates novel combinations of steps as well as novel details of construction and novel combinations and arrangements of parts, which will appear more fully in the course of the following description, which is based on the accompanying drawings. However, said drawings merely show and the following description merely describes, the invention with respect to preferred methods and apparatus, the same, nevertheless, being given by way of illustration or example only.

In the drawing, like reference characters designate similar parts in the several views.

FIG. 1 is a top plan view showing the first step, the view showing the present means in preliminary contracted condition.

FIG. 2 is a similar view showing the final step prior to welding of two pipes, said view showing the band means expanded in pipe-aligning condition.

FIG. 3 is an enlarged and fragmentary sectional view as taken on the line 3—3 of FIG. 2.

FIG. 4 is a broken perspective view of the expanding portion of the band.

FIG. 5 is a plan view similar to FIG. 2 and showing a pipe-rounding ring as used in combination with the present welding ring.

FIG. 6 is an enlarged and fragmentary sectional view as taken on the line 6—6 of FIG. 5.

FIG. 7 is a fragmentary plan view of a portion of the pipe-rounding ring.

The present invention deals with the connection of two pipes or tubes 5 and 6 so that the upper pipe 6 will comprise a vertical extension of the lower pipe 5. Conventionally, the pipe 5 is partly entered in the ground and two or more such pipes are end-connected and then driven into the ground to form a well liner or casing. As shown in FIG. 3, the adjacent ends of the pipes 5 and 6 are conventionally provided with bevels or chamfers 7 as required in arc, resistance and comparable types of welding where flux is used to conduct the welding metal into the joint where the pipes abut.

This invention, as illustrated in FIGS. 1 to 4, comprises novel band means 8 that is positioned on the end of pipe 5 and has the dual purpose of aligning the pipe 6 with the pipe 5 and controlling the weld so that weld metal and flux material may penetrate not only into the seam between the pipes but through to the band.

The band means 8 comprises generally, a band 9, wire elements 10 to engage the top edge of a pipe 5 to support the band 9 on the inside of said pipe, and a band-expanding means 11 to expand the band to the inner size of the pipes.

The band 9 is formed of a length of strip metal that has a cross-sectional form in which the middle part 12 is offset from the plane of the outer parts 13. When in circular form, as in FIG. 1, said band is of a size to loosely fit the bore of pipe 5, and the middle part 12 is offset inward, as can be seen in FIG. 3. Thus, when the band is expanded to fit the bore of pipe 5, there is formed an annular space 14 between the part 12 of the band and the inner face of pipe 5 as well as the inner face of pipe 6 when the latter pipe is positioned over the pipe 5. In practice, the length of band 9, with a suitable lap between its ends 15 and 16, is such as to fit the inner circumference of pipe 5.

The wire element 10 are preferably formed of piano wire and comprise loops 17 that have inbent ends 18 and pass through apertures 19a in the portions 12 of the bands. Said loops are outwardly directed and are adapted to rest upon the top end face of pipe 5, as in FIG. 1, to support the band 9 within the bore of said pipe.

The band-expanding means 11 comprises the mentioned band ends 15 and 16, hinges 19 and 20 connecting said ends, respectively, with the band, and a pull member 21 that is so connected to said ends 15 and 16 that said normally inwardly bent ends may be pulled from the outside of pipe 5, as by means of ring 22, to straighten from the position of FIG. 1 to that of FIG. 2. As shown in FIGS. 1, 2 and 4, the pull member 21 extends through apertures in the ends 15 and 16 and is secured by means of a knotted end 21a on the rear side of the end 16. The hinged ends 15 and 16 constitute a toggle, since the end 15 has end abutment with a shoulder 23 formed in end 16, and the hinges 19 and 20 spread apart to cause the contracted band to expand into engagement with the pipe bore.

The hinges 19 and 20 may be made in various ways. In this case, the same are shown as weakened portions of the band formed by transverse cuts made through the band parts 13 and partly through the parts 12, as indicated in FIG. 4.

The process, after the band means 8 is placed on the end of pipe 5, is carried out by, first, expanding said band means, as above explained, thereby providing said pipe 5 with an upstanding inner annular flange which comprises the upper half of the band 9, and, then, setting the pipe 6 on the pipe 5, using said flange to guide and center the pipe 6 as the same is lowered into place by a boom or similar means. The pipe 6 may be set down on the wire loops 17 or said loops may be removed before the pipe 6 is brought to final position. Leaving the loops in place does not affect the welding operation that follows, since the same readily burns away under the heat of a welding flame. In any case, the two pipes are in aligned position ready to be welded together.

Since the back-up band has the spaced portion 12, the weld material and flux are able to pass completely across between the pipe walls into space 14 and effect a weld of maximum strength. The band may be removed later or, if fused to the weld as frequently happens, said band may be left in place.

The present band 8 may be made of a size to be strong enough to round out out-of-round pipes 6 so they will better match up with the pipe 5. In instance where this is not practical, the present method may include means 25 that is initially placed around the top of pipe 5 tight enough to retain its position thereon and yet capable of being further tightened around the lower end of a pipe 6 as the latter is lowered into welding position. The means 25, thus, comprises an outer pipe-rounding device that is capable, as it is being tightened, of bringing the adjacent ends of both pipes 5 and 6 into such accurate register that welding is carried out with easy facility.

The means 25 that is illustrated comprises a two-part ring formed of parts 26 and 27, a hinge 28 connecting said parts, a clamp bolt 29 for drawing up on the parts to tighten the same around pipe 5 after assembly thereon, and a set of circumferentially spaced pipe-clamping sections 30 welded or otherwise rigidly connected to the inside of the two part ring to provide spaces 31 between adjacent sections. The inner upper sides of the sections are formed to have sloping faces 32, said faces, being circumferentially arranged, constituting a conical leadin mouth that receives the lower edge of pipe 6 and, during movement of said pipe to operative position, guiding the same to align with pipe 5. The band means 8 is placed on pipe 5, as before, the wire elements 10 being accommodated in the spaces 31 as is the pull member 21.

By tightening the sections 26 and 27 by drawing up on bolt 29, out-of-roundness of the pipes is corrected, after the band means 8 has been drawn into place by pull on the member 21 and after ascertaining that the band 9 is properly in place. The joint between the pipes is then tacked together with tack welds that are applied through the spaces 31. Now, the means 25 may be removed and welding of the seam may proceed as before.

While the foregoing illustrates and describes what is now contemplated to be the best mode of carrying out the invention with respect to both the method and apparatus, the same is, of course, subject to modification without departing from the spirit and scope of the invention. Therefore, it is not desired to restrict the invention to the particular method steps or combination or sequence of steps described, nor to the particular form of construction illustrated and described, but to cover all equivalents or modifications of the apparatus that may fall within the scope of the appended claims.

Having thus described the invention, what is claimed and desired to be secured by Letters Patent is:

1. A weld-controlling and pipe-aligning band comprising a length of strip metal having a cross-sectional form in which the middle longitudinal part of the band is offset from the outer longitudinal parts, whereby there is formed an annular space between said middle part and the inner faces of two vertical end-abutted pipes at the line of abutment and seam at which said pipes are adapted to be welded for accommodating flux and weld material applied from the outside of said seam for effecting the weld, the ends of said strip comprising hinged end-abutted toggle members that, when straightened, expand the band into contact with said inner pipe faces, and means connected to said toggle members and extending in a direction to be outward of said pipes to move said members in a band-expanding direction.

2. A band according to claim 1 provided with outwardly extending elements adapted to engage the end face of the lower of said pipes to support the band in position to lap both adjacent ends of the pipes.

3. A weld-controlling and pipe-aligning device comprising a length of strip metal forming a band provided with hinged ends normally folded inward when the band is in circular arrangement with one end abutted on the other to constitute a toggle that expands the circular size of the band when the abutted hinged ends are straightened and an outwardly directed pull member connected to both said hinged ends for pulling said ends straight.

4. A device according to claim 3 provided with outwardly directed support members for engaging the end of a pipe to support the device on the inside of and spaced from the pipe.

5. A weld-controlling and pipe-aligning band comprising a length of metal strip, a first end piece connected by first hinge means to one end of said strip, a second end piece connected by second hinge means to the other end of said strip, said strip having a substantially circular configuration with said ends spaced from each other, said first and second end pieces bridging the space between said ends and having abutting surfaces whereby when said hinge means are flexed so as to dispose said end pieces inwardly to a first position toward the axis of said circular configuration said band is disposed in a contracted condition, and when said end pieces are disposed in a second position said strip and said end pieces are disposed in an expanded condition defining a circle, and means for moving said end pieces from said first to said second position.

6. A weld-controlling and pipe-aligning band according to claim 5 wherein said end pieces are integrally joined to said strip and said hinge means are formed by weakened portions of said strip.

References Cited by the Examiner

UNITED STATES PATENTS

| | | | |
|---|---|---|---|
| 649,473 | 5/00 | Palmer | 29—491 |
| 1,939,772 | 12/33 | Greene | 285—22 XR |
| 1,960,105 | 5/34 | Greene | 285—21 |
| 1,987,341 | 1/35 | Kachel | 29—491 |
| 2,448,107 | 8/48 | Mattimore et al. | 29—491 XR |
| 2,472,523 | 6/49 | Dillon et al. | 113—111 |
| 2,537,776 | 1/51 | Markl | 113—111 XR |
| 2,681,028 | 6/54 | Phillips | 113—111 |
| 2,796,843 | 6/57 | Kleppinger | 29—491 XR |
| 2,823,634 | 2/58 | Barth | 113—103 |
| 2,871,812 | 2/59 | Pederson | 113—102 XR |

FOREIGN PATENTS

| | | |
|---|---|---|
| 547,910 | 10/57 | Canada. |
| 256,525 | 8/26 | Great Britain. |

CHARLES W. LANHAM, *Primary Examiner.*

WHITMORE A. WILTZ, *Examiner.*